United States Patent [19]
Stewart

[11] 3,753,741
[45] Aug. 21, 1973

[54] PROCESS OF PREPARING SLICED CANNED HAM

[75] Inventor: Maurice Z. Stewart, Dubuque, Iowa

[73] Assignee: Dubuque Packing Company, Dubuque, Iowa

[22] Filed: Jan. 21, 1971

[21] Appl. No.: 108,474

[52] U.S. Cl. .................................. 99/187, 99/107
[51] Int. Cl. ...................... A22c 18/00, A23b 1/00
[58] Field of Search ............................ 99/107, 187; 146/153, 160; 83/618, 620

[56] References Cited
UNITED STATES PATENTS
| | | | |
|---|---|---|---|
| 3,067,041 | 12/1962 | Monteleone | 99/187 |
| 3,628,581 | 12/1971 | Takahashi | 146/153 |
| 3,028,894 | 4/1962 | Lykkeberg | 83/620 X |
| 3,652,296 | 3/1972 | Wilkerson et al. | 99/107 |

Primary Examiner—Hyman Lord
Attorney—Clarence A. O'Brien and Harvey B. Jacobson

[57] ABSTRACT

Sliced, canned meat, and in particular, ham or pork shoulder picnic, is prepared by a two-stage cooking process wherein the unsliced meat is first sealed in a container and subjected to an initial cooking and then chilled, removed from the container, sliced in such a manner that the ham retains its original configuration, and resealed along with minor amounts of honey and meat juices in a second container and finally subjected to a second cooking process. By this invention, a presliced, canned meat is obtained which retains the shape into which it was formed prior to slicing without the need for strings or bindings around the meat and which has been cooked, subsequent to slicing, in honey.

3 Claims, 1 Drawing Figure

PATENTED AUG 21 1973
3,753,741
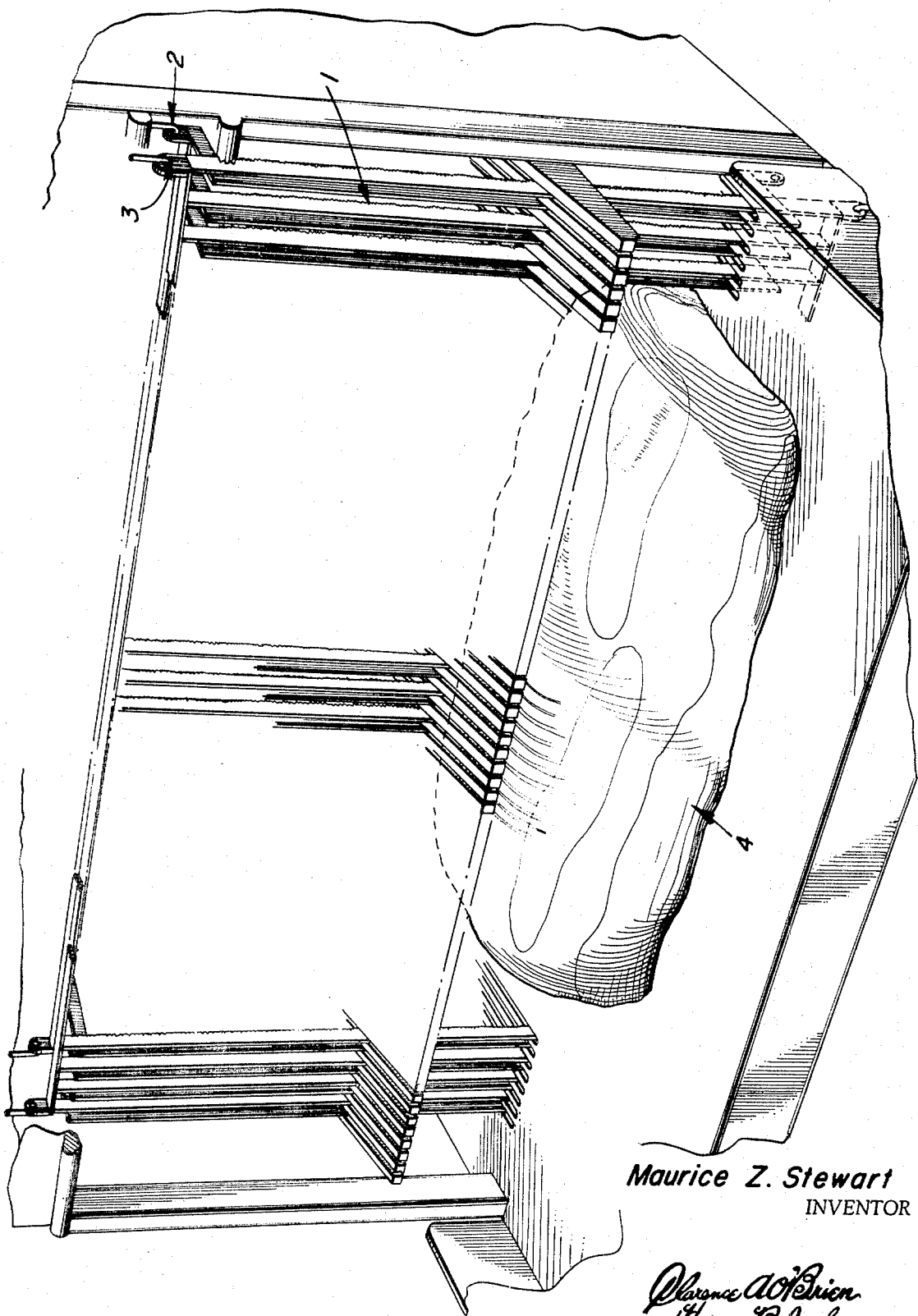
Maurice Z. Stewart
INVENTOR
BY Clarence A. O'Brien
and Harvey B. Jacobson
ATTORNEYS

PROCESS OF PREPARING SLICED CANNED HAM

This invention relates to a method for processing and packaging canned meats. More particularly, this invention relates to a method for preparing sliced canned meats (such as, for examples, hams, pork shoulder picnics, luncheon meats, and chopped meats) which are cooked twice, and in which the meat is sliced in such a manner that the meat retains its configuration and requires no strings or other artificial bindings to hold the slices together and is treated with pure honey.

It is known in the art to prepare presliced canned meats, such as hams, which afford the user the convenience of having the ham already sliced for eating once the container holding the ham is opened. For example, Monteleone, U.S. Pat. No. 3,067,041 discloses a method for packaging ham whereby the ham, subsequent to de-boning, de-fatting, and curing, is molded under pressure in a mold and then cooked at a temperature of about 150° F. Subsequent to this cooking the juices are poured off and the ham is chilled and then sliced. According to the process of the Monteleone patent, the chilled ham slices are then bound with cords or bands in order to hold them in the proper shape and the bound ham is then placed loosely in a can since, by that invention, some shrinking of the ham has occurred through loss of juices during the cooking step. The can containing the ham is then sealed by conventional methods, evacuated, and quickly raised to a temperature sufficient to kill any bacteria present in the can prior to refrigeration of the canned ham.

Canned, sliced hams or other meats prepared in this manner, however, have the disadvantage that the strings or other bindings used to tie together the slices are somewhat of a nuisance in that they must be removed by the consumer and also they preclude any cooking or extended heating of the sliced, bound meat in the can since this would tend to loosen or dissolve the strings.

It is, accordingly, an object of the present invention to provide an improved and novel means for slicing and packaging canned meat, and in particular, canned ham whereby the meat is sliced and prepared in a manner which dispenses with the need for strings or other bindings such as are employed in the Monteleone patent for maintaining ham slices in a closely held configuration and which could become loosened during any further cooking of the canned ham.

It is a further object of the present invention to provide a method for preparing canned meat wherein the meat is sliced in an unique manner which retains the original configuration and cooked with pure honey which permeates the slices during a second cooking operation to provide a meat of superior flavor and tenderness and assists in holding the slices of meat together.

It is yet a further object of the present invention to provide a method for preparing sliced, canned meat wherein the meat is subjected, during preparation, to a vacuum at three different stages and actually cooked in two stages, once prior to slicing and once again, after the meat slices have been repackaged in a can along with a suitable amount of honey.

These and other objects are accomplished according to the instant invention as appears more clearly from the following description taken in conjunction with the accompanying drawing.

Depending on the particular meat or meat product being processed, it is desirable before canning to suitably trim and cure the meat. This is particularly true in the case of whole pieces of meat having significant pockets of fat whose retention can adversely affect the binding qualities of the slices. For example, in the case of ham or picnics, the meat is first skinned and de-fatted where necessary in order to remove these primary pockets of internal fat and leave only a layer of fat sufficient to provide the necessary flavor juices for cooking; for such meats, about one-sixteenth to one-eighth inch of external fat covering is preferred. The outer shank area of the ham or picnic together with surrounding membrane are also removed and the meat then suitably cured, for example, by injecting a curing solution and allowing it to cure for the requisite amount of time. In the case of loaves of chopped or otherwise "processed" meats, for example, it is generally possible to dispense with these trimming and curing procedures, however.

After trimming and curing where necessary, the meat is pressed tightly into a can of appropriate size and shape and subjected to a first vacuum to form the desired shape for the meat. The can is subjected for the second time to a vacuum and sealed with the meat therein. This canned, but as yet unsliced meat, is then cooked in hot water for a sufficient period of time so that the internal temperature of the meat reaches at least about 140° F. The canned meat is then removed from the hot water and thoroughly chilled at a temperature of about 35° to 40° F. If desired, the cooked, unsliced, canned meat can be stored in a cool area for a period of time not longer, however, then 7 days in the case of pork, before further processing.

In the second stage, slicing, repackaging, and second cooking of the meat is carried out by removing the cooked, unsliced meat from the can in which it was originally cooked and chilled and then stripping the solidified meat juices from the meat. At this point the meat, which is at a temperature of about 35° F, is then cut into slices of about three-sixteenths of an inch in thickness. This procedure is carried out on a specially designed conveyorized slicing machine which makes all of the slices simultaneously and uniformly of the requisite thickness while allowing the meat to retain its original configuration prior to slicing. This slicing procedure is of particular importance in the practice of the present invention since it has been found that the slicing of the meat in one simultaneous operation to obtain uniform slices of about three-sixteenths inch thickness is a significant factor in the cohesiveness of the slices. It, therefore, contributes substantially to the unique advantages of the present invention in producing a sliced, packaged meat which at no time during its preparation or packaging requires binding with strings.

Subsequent to slicing, the sliced meat is then packed in a properly labeled can of substantially the same size as the can in which the meat was originally cooked in its unsliced condition. About 5 percent by weight of pure honey, based on the weight of the sliced meat, is then added to the canned, sliced meat along with a sufficient quantity of the solidified meat juices which were previously removed to bring the weight of the ingredients of the can back up to the original weight of the meat after trimming but before its first cooking. Thus, the total net weight of the meat is not diminished but is substantially the same as the trimmed, cured, "raw"

meat prior to the initial packaging and cooking and will therefore fit tightly into substantially the same size can as the one in which it was initially cooked, eliminating the need for bindings to retain the shape of the meat.

The sliced meat along with added honey and replaced solidified meat juices are vacuum sealed into the can with the meat in its original unsliced configuration and subject to a second cooking in water having a temperature of about 155° F. The internal temperature of the meat is brought up to about 150° F and held at this temperature for a period of about 30 minutes. This second cooking of the meat not only enhances the tenderness and juiciness of the meat, but also inhibits bacterial growth and permits the honey and solidified meat juices to permeate between and into the slices of the meat.

Subsequent to this second cooking procedure, the sliced meat is then again quickly chilled in refrigerated water and placed in the cartons where it can be held in a cooled area until shipment.

While it is not intended that the invention be limited to any specific theory, it is believed that several aspects of the invented process contribute to the unique binding capabilities of the present sliced meat product. In particular, it is believed that the steps of slicing the meat in one simultaneous slicing operation and cooking the sliced meat with the honey significantly aids in binding the meat slices together and eliminates the necessity for additional holding means, such as string and the like. In addition, the removal of air from the meat by subjecting it to three different vacuum treatments along with removal of internal fat pockets is believed to also contribute to the binding qualities.

The device employed according to the present invention to slice the meat into uniform slices while retaining the original shape of the meat is very similar in construction to commercial bread slicing machines. The main distinction is that the slicing device of the present invention employs blades set to cut slices about three-sixteenths inch thick, which is substantially thinner than bread is normally sliced. Referring to FIG. 1, which shows the meat slicing device of this invention, stainless steel blades 1 are shown set vertically into two rigid frames 2 and 3. The piece of meat which is to be sliced 4 is forced through the steel blades which move rapidly in a vertical reciprocating motion to effect cutting of the meat. The two frames are so mounted that during the reciprocating cutting motion, one half of the blades move in a downward motion while the other half are in an upward motion. In operation, the blades which are reciprocating rapidly in an "up and down" motion as the meat is forced through, simultaneously cleanly slice the meat into slices of the requisite thickness while permitting the meat to retain its original configuration.

The process of the present invention is applicable to a variety of meats including pork shoulder picnics, luncheon meats, and chopped meats. Hams have been found to be particularly suitable for use in the present invention, however, and the unique secondary cooking with honey imparts a delicious flavor to the meat.

For example, five pound hams prepared according to the process of the present invention provide the customer with the convenience of a presliced, canned ham which in addition has a greater stability and general keeping quality than presliced, canned products heretofor known in the prior art. These hams are conveniently prepared for serving by simply removing the contents from the can and placing them on a baking tray where they may be browned and heated at about 300° F in an oven for about 75 minutes. At the end of this time, the browned and baked sliced ham is ready to be served as desired, such as making ham sandwiches, for example.

EXAMPLE

A ham was first skinned and de-fatted to approximately one-eighth inch external fat covering, and in addition, all primary pockets of internal fat were removed. The outer shank area, together with surrounding membrane, were also removed.

The ham was then injecto-pumped with curing solution to comply fully with Meat Inspection Regulations. After an approximate 48 hour cure, the ham, which weighed about five pounds following curing, was transferred to the canning area where it was placed in essentially plain cans (unlabeled except for embossed date codes), pressed under vacuum and formed with a ham press, and then vacuum sealed. The can containing the ham was then cooked in hot water so that the ham obtained an internal temperature of about 140°. The ham was then thoroughly chilled to about 38° F.

After the can was opened and the ham removed, the solidified meat juices were stripped off of the ham just prior to slicing. The hams were then conveyorized through a specially designed slicing machine which simultaneously made uniformly-cut slices of approximately three-sixteenths of an inch thickness. The ham slices remained in their original configuration and did not separate or "fall apart" from each other. After slicing, the ham was packed tightly into a properly labeled can and 4 ounces of honey added to the ham. Then 6 ounces of the solidified meat juices (stripped from the ham before slicing) were re-added to the ham for a total weight of "net weight 5 lbs." The ham was then resealed under vacuum in a second can and heated in 155° water for a sufficient time to bring the internal temperature to 150°, which temperature was held for a period of 30 minutes. The cooked, sliced, canned ham was then again quickly chilled in refrigerated water, packed into cartons and held in a cooler area until shipment was made.

Having described the invention, it will be apparent to those skilled in the art that minor modifications may be made in the process described and illustrated without in any way departing from the spirit and scope of the invention. Accordingly, it is intended and understood that the invention not be limited to the exact details disclosed hereinbefore, but should be determined in accordance with the appended claims.

It is claimed:

1. A method for preparing sliced, canned meat which comprises deboning, trimming, curing and defatting the meat; pressing and molding the unsliced meat into a container and vacuum sealing the container; cooking the meat in said container for a first time by heating the container for a period of time and at a temperature sufficient to bring the internal temperature of the meat to about 140° F; chilling said meat in the container and removing the chilled meat from the sealed container; removing solidified meat juices from said meat and then simultaneously cutting the meat into uniform slices of desired thickness while retaining the meat in its original unsliced configuration; vacuum sealing the sliced meat into a can along with about five percent by weight of honey, based on the weight of the meat, and sufficient of said removed meat juices to bring the total weight of the meat, honey, and juices to substantially the weight of the meat prior to said first cooking while still retaining the unsliced configuration of the meat and cooking said sealed meat slices, honey, and meat juices for about thirty minutes at an internal temperature of about 150° F.

2. The method of claim 1 wherein said meat is ham or pork shoulder picnic.

3. The method of claim 1 wherein subsequent to said second cooking, the canned, sliced meat is chilled.

* * * * *